United States Patent Office 2,736,752
Patented Feb. 28, 1956

2,736,752
PROCESS FOR THE PREPARATION OF HEXAHYDROXYBENZENE

Ullrich Hoffmann, Bad Homburg (Taunus), Otto Schweitzer, Frankfurt am Main, and Karl Rinn, Darmstadt, Germany, assignors to Deutsche Gold- und Silber-Scheideanstalt, vormals Roessler, Frankfurt am Main, Germany No Drawing. Application November 24, 1952,
Serial No. 322,348

Claims priority, application Germany December 1, 1951

9 Claims. (Cl. 260—621)

The present invention relates to the production of hexahydroxybenzene by hydrolyzing alkali metal salts of hexahydroxybenzene with water, alcohols or acids.

It is already known that potassium carbonyl $(KCO)_6$ is obtained as a by-product in the preparation of metallic potassium from carbon and potassium carbonate, which carbonyl upon hydrolysis yields hexahydroxybenzene. The same product is obtained when carbon monoxide is passed over metallic potassium. An analogous reaction with other alkali metals has hitherto been unknown. Although a reaction between carbon monoxide and other alkali metals is known, the product obtained with a dimeric carbonyl of the formula $(MeCO)_2$ which upon hydrolysis yields glyoxal rather than hexahydroxybenzene.

It has now been unexpectedly discovered that the hexacarbonyls of alkali metals other than potassium, preferably of sodium, can be produced in a relatively smooth reaction from the metals and carbon monoxide if the reaction is permitted to proceed in a closed system at elevated temperatures and pressures. The results obtained were even more surprising, as according to previous experiences under these conditions, metallic potassium reacts with carbon monoxide to produce potassium carbonate and carbon exclusively. It was also found that in the production of the sodium hexahydroxybenzene certain temperature limits must be observed in connection with the pressure employed, over these limits, the formation of sodium carbonate is favored. For example, this limit is about 380° C. at a pressure of about 70 atmospheres and 340° C. at a pressure of about 140 atmospheres. Under the critical limit the alkali metal carbonate is only formed in relatively small quantities as a by-product. The sodium employed for the reaction can with advantage be alloyed or mechanically mixed with up to 10% of other alkali metals such as lithium or potassium or alkaline earth metals such as calcium as a better subdivision of the sodium and a more complete conversion of the sodium is obtained. Sodium can also advantageously be employed in the form of its amalgam.

The addition of inert gases, such as nitrogen or methane, to the carbon monoxide employed is without influence on the course of the reaction, but can be of advantage in preventing local overheating caused by a too rapid reaction.

The reaction product which, depending upon the reaction conditions employed, can contain a greater or lesser quantity of unconverted alkali metal, is then hydrolyzed to form hexahydroxybenzene. The latter can be isolated or can be directly converted into other products by appropriate chemical reactions. In contrast to the corresponding potassium compound, the sodium hexahydroxybenzene is easily hydrolyzed without the known difficulties of handling of the potassium hexahydroxybenzene caused by the extraordinarily labile character of such compound.

The hexahydroxybenzene obtained is not only of interest in that upon oxidation tetrahydroxy quinone, rhodizonic acid, triquinoyl, croconic acid and leuconic acid can be obtained, but also in that upon hydrogenation, inositol can be obtained.

In practice of the process according to the invention, the sodium or sodium with additions of other alkali metals or alkaline earth metals is, for example, introduced into a rotary steel autoclave and carbon monoxide is introduced until the desired starting pressure is obtained. Thereafter the autoclave is heated to the desired reaction temperature. As the surface of the alkali metal quickly acquires a hard crust of the reaction product, it was found advantageous to introduce grinding bodies especially those with sharp edges into the autoclave to grind off the crusts as they are formed. In view of the increase of the temperature, the beginning pressure increases substantially and then after the reaction proceeds gradually, decreases to that engendered by the excess of the carbon monoxide employed.

The main reaction proceeds according to the following equation:

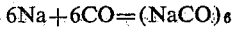
$$6Na + 6CO = (NaCO)_6$$

A smaller quantity of carbonate can also be formed according to the following equation:

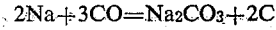
$$2Na + 3CO = Na_2CO_3 + 2C$$

A certain portion of unreacted alkali metal may remain in the reaction mixture in view of insufficient freeing of the surfaces thereof. The relative proportion of the unreacted alkali metal, however, decreases with an increase in the quantity of metal originally charged.

It is also possible to introduce the alkali metal into the autoclave in a highly dispersed form such as, for example, in the form of a suspension or a colloidal solution. Preferably relatively non-volatile dispersing mediums are employed for this purpose.

It is possible according to the invention to convert up to 80% of the alkali metal charged into the corresponding hexacarbonyl. The remainder of the quantity of alkali metal charged is either converted to the carbonate or is occluded in the reaction product and remains unchanged.

The addition of small amounts of alkali metal salts to the reaction mixture is advantageous as facilitating the grinding off of formed crusts and a more complete reaction of the alkali metal originally charged.

The reaction for the production of the hexacarbonyl compounds can be carried out at temperatures between 250° C. and 380° C., preferably at 340° C., and at pressures between 30 atmospheres and 180 atmospheres, preferably between 70 and 90 atmospheres.

The hexacarbonyl compounds obtained are easily converted to hexa hydroxy benzene by conventional hydrolysis with compounds having a mobile hydrogen atom such as water and acids, for example, acetic acid. Whilst the hexa hydroxy benzene can very easily be oxydized under the conditions of hydrolysis, it is advisable to exclude the presence of oxygen during this part of the process; otherwise it may be undertaken in the presence of reducing agents, as for instance stannous chloride acidified by hydrogen chloride.

The following examples will serve to illustrate the manner in which the process according to the invention can be carried out.

Example 1

A rotary autoclave containing iron balls for grinding reaction products was charged with 25 grams of sodium and sufficient carbon monoxide to provide a pressure of 90 atmospheres and heated to 340° C. After 4 hours rotation at this temperature, the pressure amounted to 76 atmospheres and an analysis of the reaction product indicated that 38% of the sodium had been converted to the sodium salt of hexa hydroxy benzene, 32% to sodium carbonate and 30% remained unchanged.

Example 2

25 grams of sodium containing 1.5% of lithium were treated with carbon monoxide at a starting pressure of 70 atmospheres at 340° C. for 4 hours in a rotary autoclave provided with angular grinding bodies. The carbon monoxide taken up amounted to 8 atmospheres and an analysis of the reaction mixture indicated that 41% of the sodium had been converted to the sodium hexacarbonyl, 26% to the carbonate and 33% remained unreacted.

Example 3

25 grams of sodium with a 1% potassium content were treated in an autoclave as in Example 2 for 7½ hours. The carbon monoxide taken up amounted to 14 atmospheres and 77.5% of the alkali metal was converted to the hexacarbonyl, 22.5% to the carbonate.

Example 4

25 grams of sodium were treated with carbon monoxide at starting pressure of 70 atmospheres at 340° C. for 8.8 hours in a rotary autoclave provided with iron cubes as grinding bodies. 72% of the sodium was converted to the hexacarbonyl, 15.4% to the carbonate and about 12.6% remained unreacted.

Example 5

25 grams of sodium are treated with carbon monoxide in the presence of 1 gram of sodium carbonate at a starting pressure of 70 atmospheres at 340° C. for 7½ hours in a rotary autoclave as in the foregoing examples. The reaction mixture is then treated with methanol to remove the unreacted sodium and after finishing of the hydrogen development the sodium hexa carbonyl is hydrolyzed with water in the presence of a small amount of stannous chloride and hydrogen chloride. After evaporating the methanol and cooling of the solution the hexa hydroxy benzene separates in white crystals which have been identified by the melting point of its acetylic compound. 19.5 grams of hexa hydroxy benzene are obtained i. e. 62% of theory of the initially employed sodium.

We claim:

1. In a process for the production of hexa hydroxybenzene by reacting an alkali metal and carbon monoxide to form an alkali metal carbonyl and hydrolyzing such carbonyl the step which comprises reacting sodium with carbon monoxide at an elevated temperature up to 380° C. and an elevated pressure up to 180 atmospheres to form the alkali metal carbonyl.

2. In a process for the production of hexa hydroxy benzene by reacting an alkali metal and carbon monoxide to form an alkali metal carbonyl and hydrolyzing such carbonyl the step which comprises reacting sodium with carbon monoxide at an elevated temperature between 250° C. and 380° C. and an elevated pressure between 180 and 30 atmospheres to form the alkali metal carbonyl.

3. A process according to claim 2, in which the reaction between the sodium and the carbon monoxide is carried out at a temperature between 250 and 380° C. and at pressures between 180 and 70 atmospheres.

4. A process according to claim 2, in which the reaction between the sodium and the carbon monoxide is carried out at a temperature of about 340° C. and at pressures between about 70 and 90 atmospheres.

5. A process according to claim 2, in which said sodium is admixed with up to 10% of another metal selected from the group consisting of the alkali and alkaline earth metals.

6. A process according to claim 2, in which said sodium is admixed with up to 10% of a sodium salt.

7. A process according to claim 2, in which said sodium is reacted in the form of an amalgam.

8. A process according to claim 2, in which said reaction is carried out in the presence of an inert gas.

9. A process according to claim 2, in which said reaction is carried out in a closed rotating autoclave containing grinding bodies.

References Cited in the file of this patent

Berichte, vol. 18 (1885), pp. 1834–1840, 7 pages.

Joannis: Compt. Rend., vol. 116 (1893), p. 1520, 1 page only.